April 16, 1968   L. T. STEINER   3,378,155
HAULING APPARATUS FOR SLAG AND THE LIKE
Filed Feb. 24, 1966   8 Sheets-Sheet 1

INVENTOR.
Larry T. Steiner
BY
*B. B. Olive*
ATTORNEY

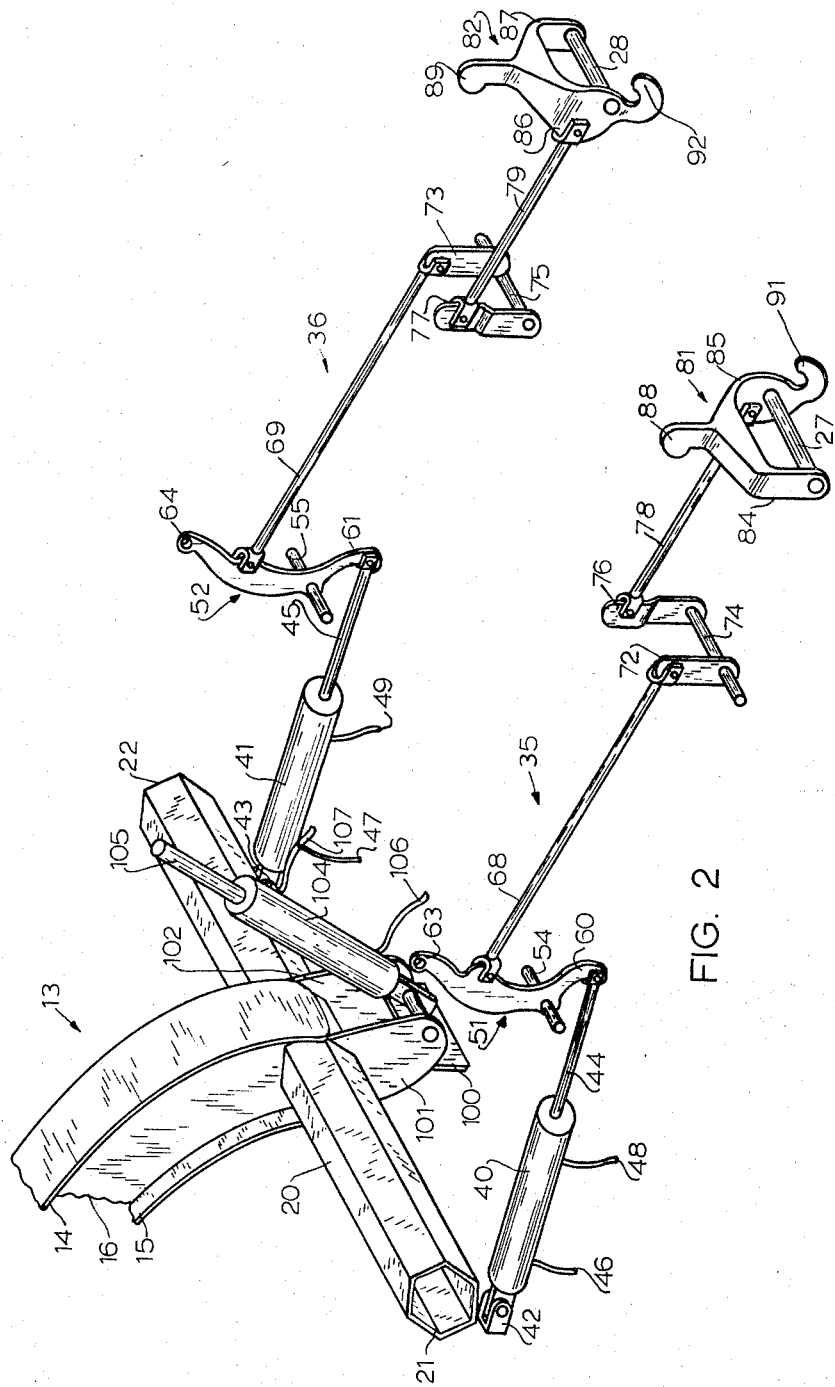

April 16, 1968    L. T. STEINER    3,378,155
HAULING APPARATUS FOR SLAG AND THE LIKE
Filed Feb. 24, 1966    8 Sheets-Sheet 3
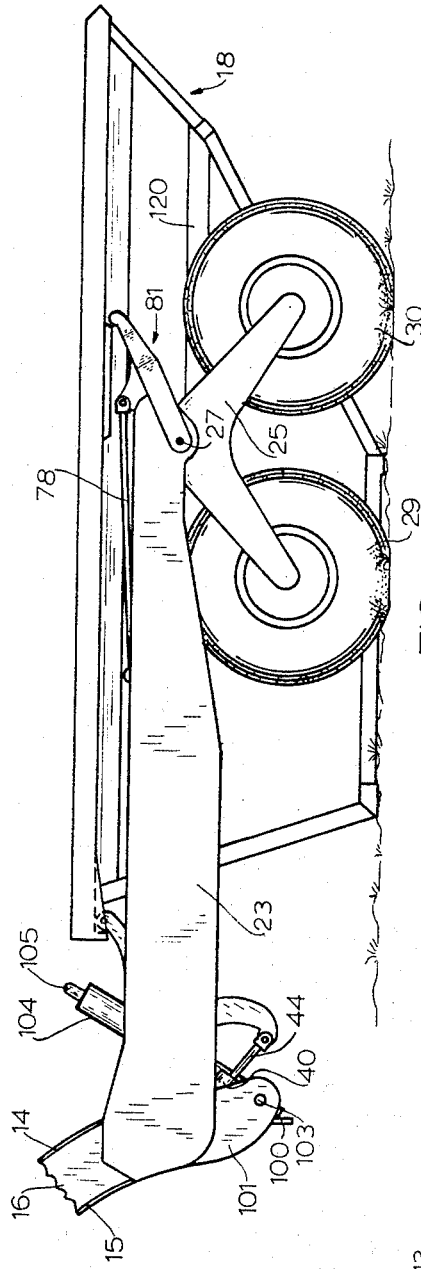
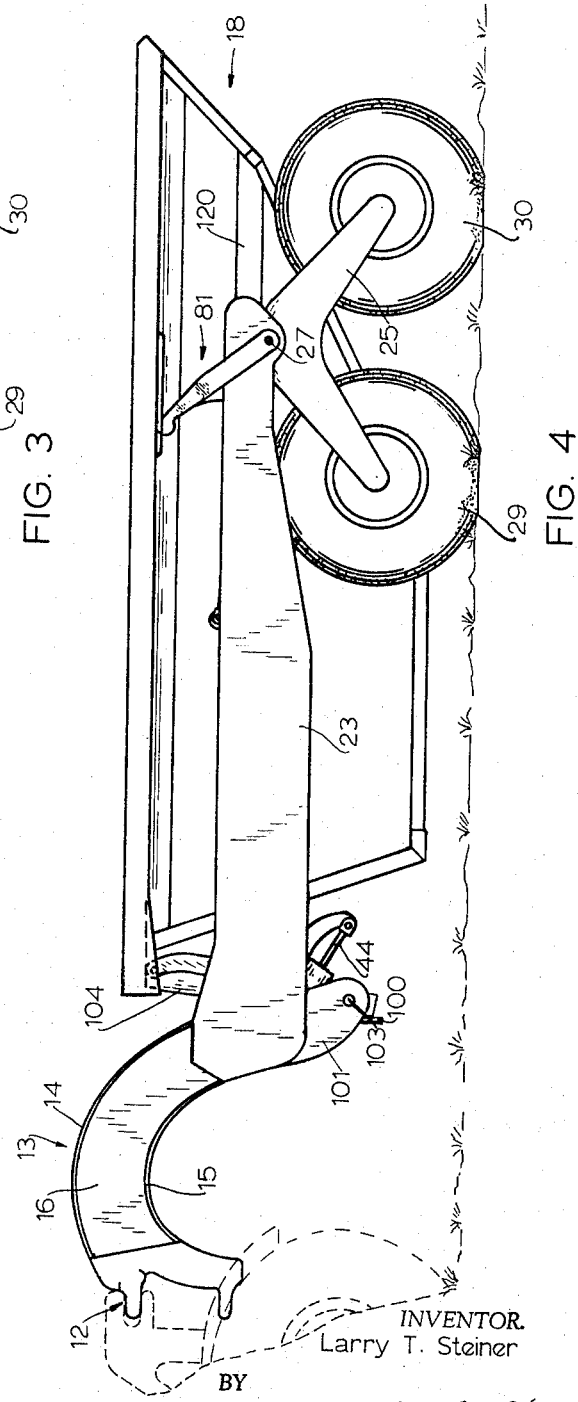
INVENTOR.
Larry T. Steiner
BY
ATTORNEY

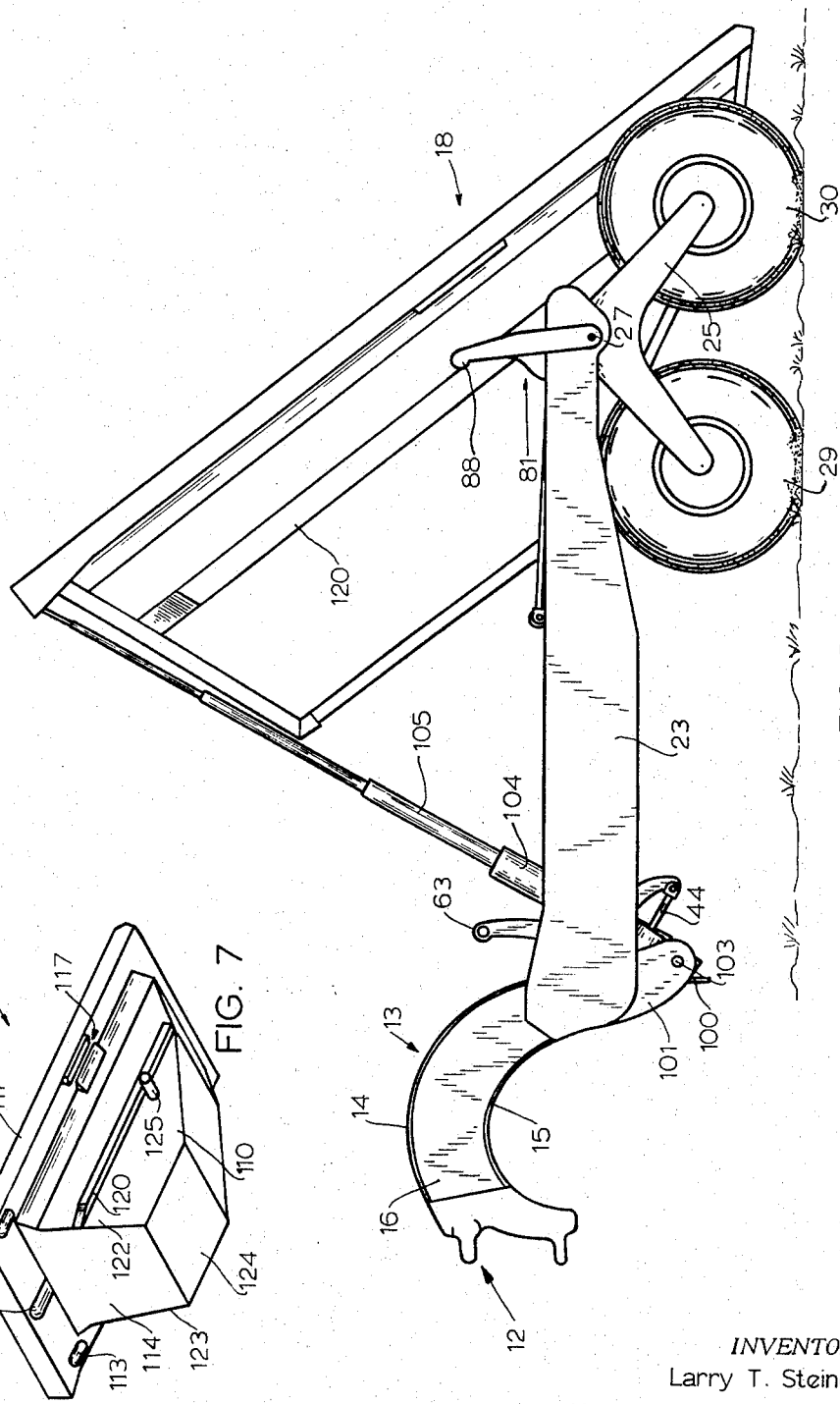

*INVENTOR.*
Larry T. Steiner

BY

B. B. Olive
ATTORNEY

April 16, 1968     L. T. STEINER     3,378,155
HAULING APPARATUS FOR SLAG AND THE LIKE
Filed Feb. 24, 1966     8 Sheets-Sheet 6
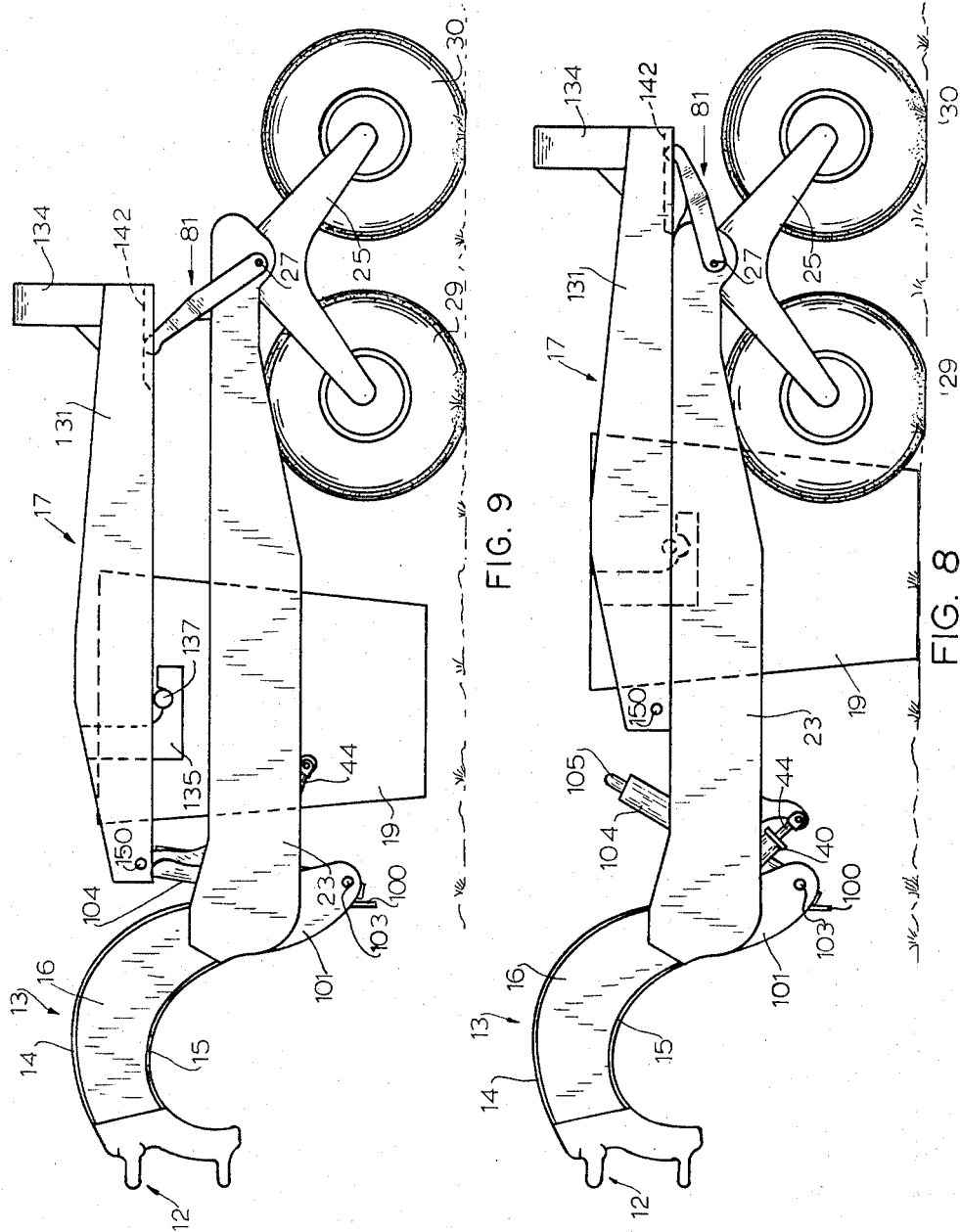
INVENTOR.
Larry T. Steiner
BY
*B. B. Olive*
ATTORNEY INVENTOR.
Larry T. Steiner
BY
B. B. Olive
ATTORNEY United States Patent Office 3,378,155
Patented Apr. 16, 1968

3,378,155
HAULING APPARATUS FOR SLAG
AND THE LIKE
Larry T. Steiner, Raleigh, N.C., assignor to Athey
Products Corporation, Raleigh, N.C., a corporation of Illinois
Filed Feb. 24, 1966, Ser. No. 529,745
9 Claims. (Cl. 214—390)

ABSTRACT OF THE DISCLOSURE

A heavy duty U-shaped trailer for hauling slag or the like in a receptacle is provided with lift arms and a tilting mechanism which enable the receptacle to be raised from a rest position at one station and transported on the trailer and then tilted to dump the contents and be placed down at the same or another station at which the receptacle is separated from the trailer.

This invention relates generally to a vehicle for transporting receptacles and, more particularly, to a slag hauler adapted to lift and transport a slag receptacle or slag pot.

In the moving of hot slag material by means of a motor vehicle, the slag is deposited into the receptacle of a slag carrying vehicle. This vehicle transports the slag to a dump area and by appropriate means discharges the same. Vehicles of this type which are adapted to carry hot slag are quite large and when fully loaded may weigh as much as 250,000 pounds; therefore, it is evident that powerful and expensive prime movers or tractors must be provided to pull heavy loads of this type. It is currently the practice to replace a loaded vehicle including both tractor and trailer with an empty one at the loading dock. This procedure requires a prime mover for each receptacle although in actual practice the prime mover remains idle a major portion of the time while the slag receptacle is being filled. The art would be substantially advanced if a prime mover and trailer were provided which were adapted to lift a slag receptacle into a carrying position and subsequently tilt the slag receptacle to dump the contents therein at a desired location. Therefore, an object of this invention is to provide a prime mover and trailer constructed to pick up, transport and dump hot slag material.

Another object of this invention is to provide a heavy duty slag hauler which is adapted to lift and carry either a vessel which is adapted to receive molten slag or a receptacle which is adapted to receive hot solidified slag.

A further object of this invention is to provide the trailer portion of a slag hauler with means adapted to engage a slag receptacle and lift the same into a position for transportation.

A still further object of this invention is to provide the trailer portion of this invention with means for engaging and tilting the slag receptacle.

Yet another object of this invention is to provide a slag receptacle for a slag hauler which is adapted to be loaded from either side or from the rear portion thereof.

Yet still another object of this invention is to provide the trailer portion of a slag hauler with a self-aligning mechanism which adapts the trailer to straddle the slag receptacle.

Other objects and advantages of this invention will become apparent when the following detailed description is read in conjunction with the specification, claims and appended drawings. A preferred embodiment and adaptation of the same will now be described with reference to the accompanying drawings, in which:

FIGURE 2 is a pictorial skeleton view of the trailer portion with the frame removed so as to show the lifting and tilting mechanism;

FIGURE 3 is an elevation view showing the lift arms in position as they receive a slag receptacle;

FIGURE 4 is an elevation view showing the slag hauler supporting a slag receptacle in a transporting position and showing the draw bar of the trailer having been connected to a prime mover;

FIGURE 5 is an elevation view of the slag hauler showing a hydraulic piston tilting the slag receptacle into a dumping position;

FIGURE 7 is a pictorial perspective view of the underside of the slag receptacle;

FIGURE 8 is an elevation view of the trailer showing the same adapted to lift a removable frame which in turn is adapted to support a slag pot;

FIGURE 9 is an elevation view of the trailer showing the same having lifted the removable frame into a carrying position with the removable frame supporting the slag pot;

Figure 16:
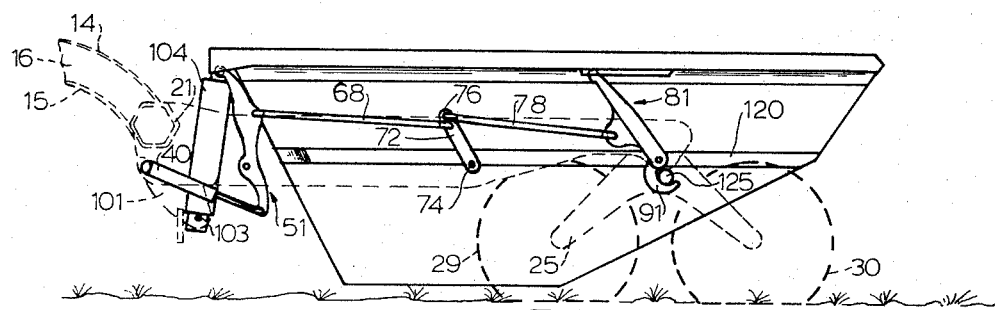
Figure 17:
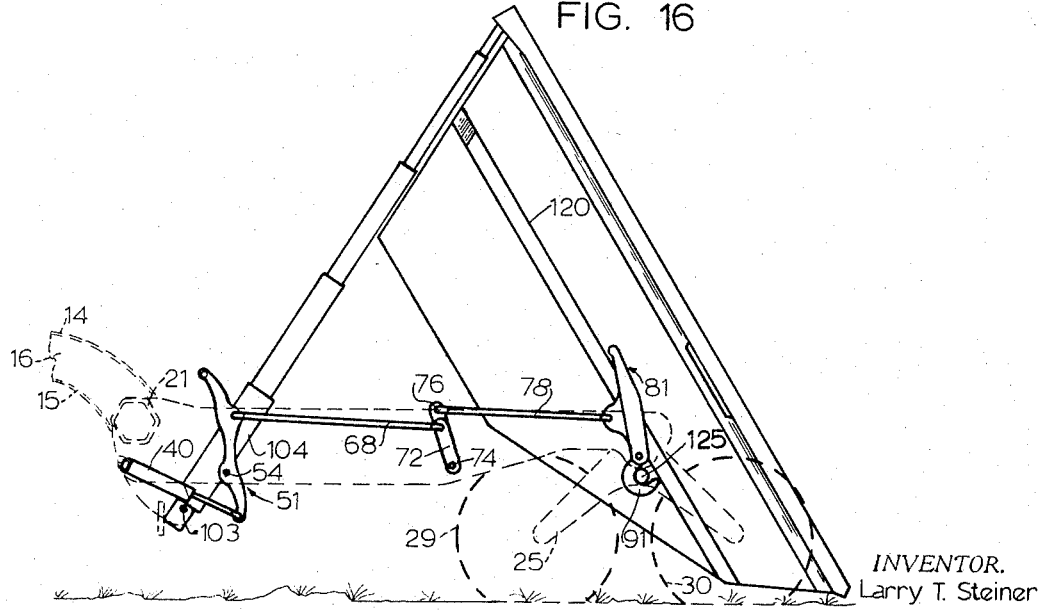

FIGURE 16 is a partial skeleton, elevation view of the trailer and slag receptacle showing the lift arms of the trailer having been pivoted into a position for carrying the receptacle and the pins about which the receptacle may be pivoted being received by the hooks; and FIGURE 17 is a partial skeleton, elevation view of the trailer and slag receptacle showing the receptacle having been tilted into a dumping position by the tilting cylinder about the pivoting pins.

This invention in the first embodiment disclosed includes a prime mover which is connected to a horseshoe shaped trailer having draft arms which define an open ended compartment and which are joined at the forward end by means of a hexagonal torque tube. The draft arms as well as the torque tube are substantially hollow to reduce the weight of the trailer. Little strength is lost since the material comprising the torque tubes and draft arms encompasses a larger area thus increasing their moment of inertia. A rear trailer suspension and wheel assembly are mounted on the draft arms at the rear portions thereof. The draft arms contain hydraulically operated linkages which receive, lift and position suitable receptacles for transporting the same to various sites. Upon backing the trailer into the receiving position, the draft arms pass along side of and partially or fully envelop the slag receptacle on three sides. With the trailer in proper position in relation to the receptacle, hydraulic cylinders actuate a plurality of lift arms by means of linkages. The lift arms which are pivotally mounted on the draft arms are raised through an arc and the ends of the lift arms seat themselves into suitable sockets or grooves which are an integral part of the receptacle. As the lift arms continue to travel in their respective arcs, the receptacle is lifted upwardly and forwardly whereupon the forward part of the receptacle is positioned on an upwardly extending hydraulic piston which is received by a hydraulic cylinder being pivotally mounted on the trailer. Simultaneously with the hydraulic piston receiving the forward part of the receptacle, a pair of laterally extending pins which are mounted on the rearward portions of the receptacle are received by a pair of hooks which are integral with and extend downwardly from a pair of selected lift arms. The hooks serve as a rest support for the pins while the trailer is transporting the receptacle. When the receptacle is tilted into a dumping position by extending the upwardly positioned hydraulic piston, the forward end of the receptacle travels upwardly through an arc and pivots about the pins which are received by the hooks. Upon dumping the slag, the extended hydraulic piston is retracted thereby lowering the receptacle to rest on the upwardly extended lift arms.

In a second embodiment, the trailer is adapted to carry a slag pot which receives molten slag. For this embodiment, the trailer is provided with a removable frame which is shaped substantially like a loop and has surfaces which are supported by the top surface of the lift arms. The removable frame is provided with hooks which engage a pair of pins protruding radially from the body of the slag pot to support the same. The removable frame is raised by the lift arms into a transporting position in the same manner as the slag receptacle is raised.

The invention is illustrated in connection with the accompanying drawings in which the figures are illustrative of the preferred embodiments of the invention.

A trailer 10 is pivotally connected to a prime mover 11 by a draw bar 13 which integrally extends from trailer 10 and which is linked to prime mover 11 by swivel connection 12. The prime mover 11 may be of any common type suitable to the purposes of the invention as hereafter described. Draw bar 13 is comprised of spaced apart top and bottom flange members 14 and 15 and connecting portions 16. Draw bar 13 is integrally connected to an elongated hexagonal hollow torque tube 20 at a point substantially equidistant between ends 21 and 22 thereof. Torque tube 20 is designed to transmit a portion of the load carried by trailer 10 to prime mover 11. Torque tube 20 has hollow draft arms 23 and 24 extending rearwardly from and integrally connecting to ends 21 and 22, respectively. Draft arms 23 and 24 and torque tube 20 form a U-shaped frame assembly which is open at the rear of the vehicle and which is adapted to receive a slag receptacle 18 or a slag pot 19. Draft arms 23 and 24 are each provided with pivotally mounted, inverted V-shaped walking wheel supports 25 and 26, respectively, which are respectively mounted on axles 27 and 28. Walking wheel support 25 rotatably receives wheels 29 and 30 and walking wheel support 26 rotatably receives wheels 31 and 32. Wheels 29, 30, 31 and 32 are preferably pneumatic tires since such tires are now commercially available for heavy tonnages and furthermore such tires provide a desired cushioning and spring effect for the loads.

The particular form of construction and material employed in manufacturing tube 20, arms 23 and 24 and supports 25, 26 may vary; however, a welded, bent, high strength, steel plate type construction has proven satisfactory and is preferred.

In order to pick up and carry receptacle 18, the draft arms 23 and 24 are provided with hydraulically operated linkages 35 and 36, respectively. Hydraulic cylinders 40 and 41 are pivotally mounted respectively on the ends of draft arms 23 and 24 by means of brackets 42 and 43. Piston arms 44 and 45 which are slidably mounted in hydraulic cylinders 40 and 41 operate in a conventional manner and are respectively moved outwardly by pressurized fluid entering through hydraulic lines 46 and 47 and are moved inwardly by pressurized fluids entering hydraulic cylinders 40 and 41 through hydraulic lines 48 and 49. Hydraulic lines 46, 47, 48 and 49 are connected to a pressurized fluid source (not shown) which may be mounted on prime mover 11.

Figure 1:
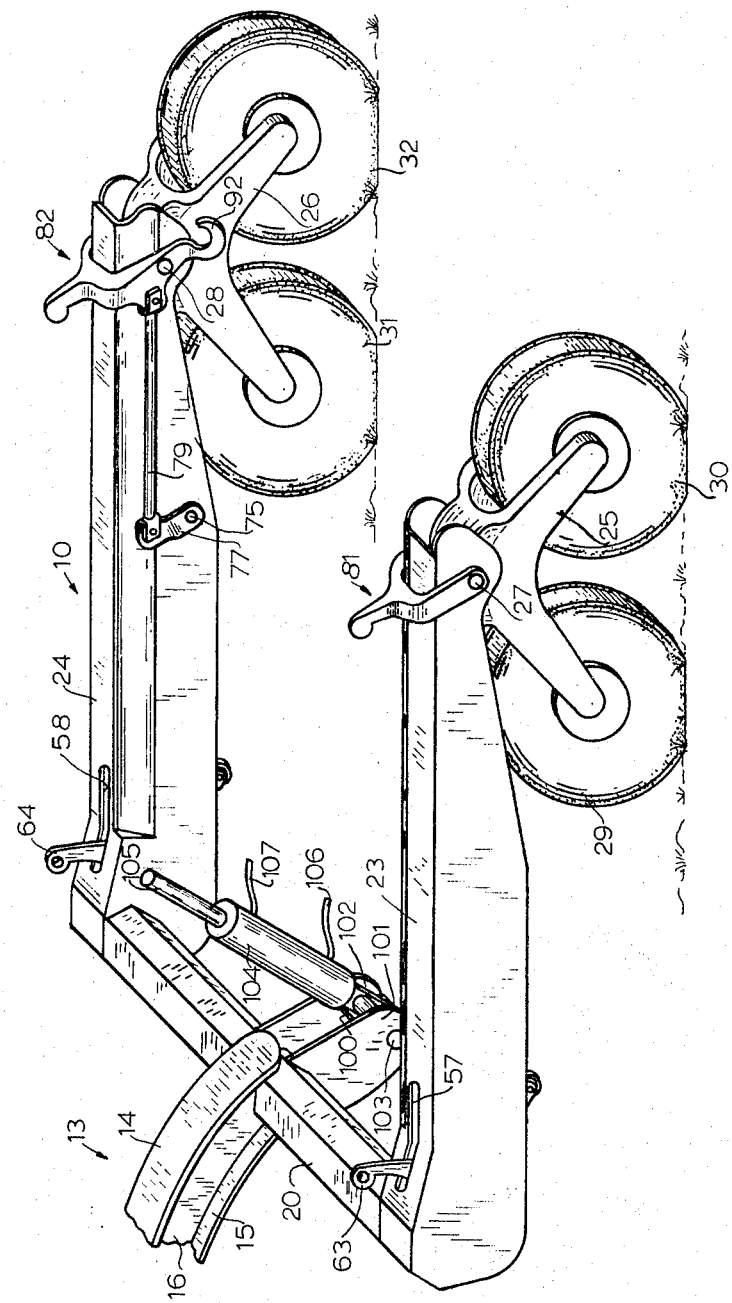
FIGURE 1 is a perspective view of the trailer portion of the invention with the lift arms of the trailer raised into a supporting position.
Figure 10:
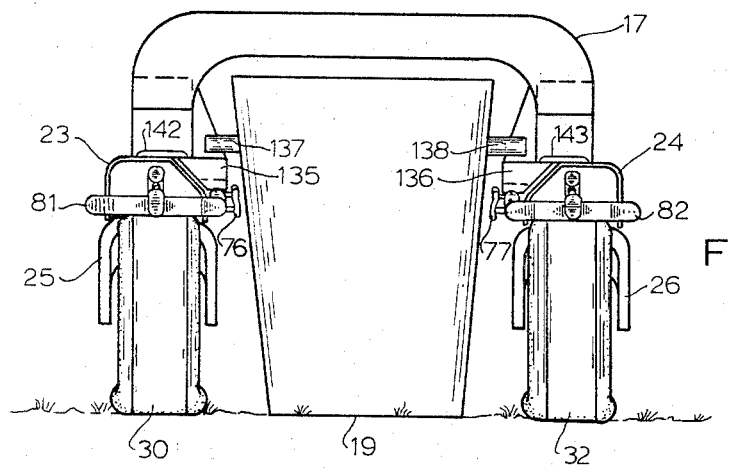
FIGURE 10 is a rear end elevation view of the trailer showing the removable frame supported thereon and with the slag pot in position to be lifted into a transporting position.
Figure 11:
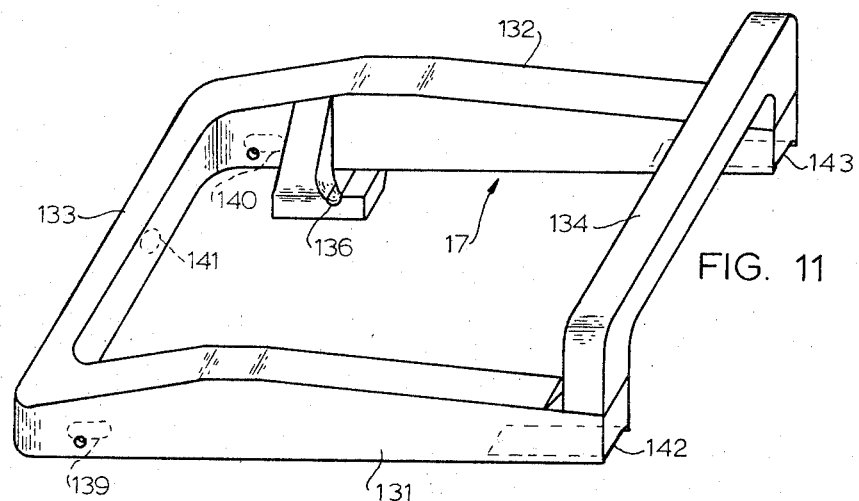
FIGURE 11 is a pictorial perspective view of the removable frame showing the hooks for receiving the slag pot and showing the slots (in dotted lines) for receiving the lift arms and tilting cylinder.
Figure 6:
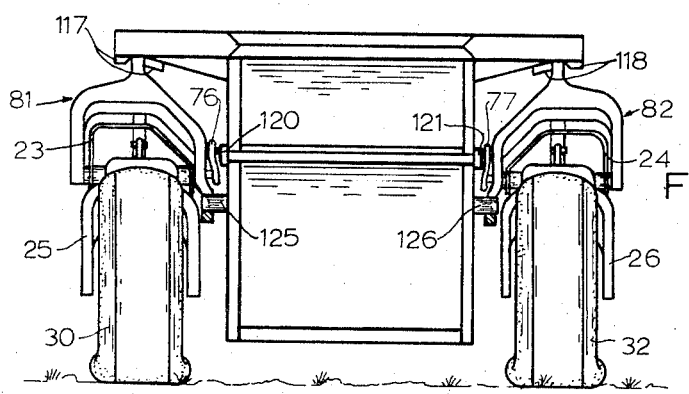
FIGURE 6 is a rear end elevation view of the slag hauler with the slag receptacle in a transporting position.
Figure 12:
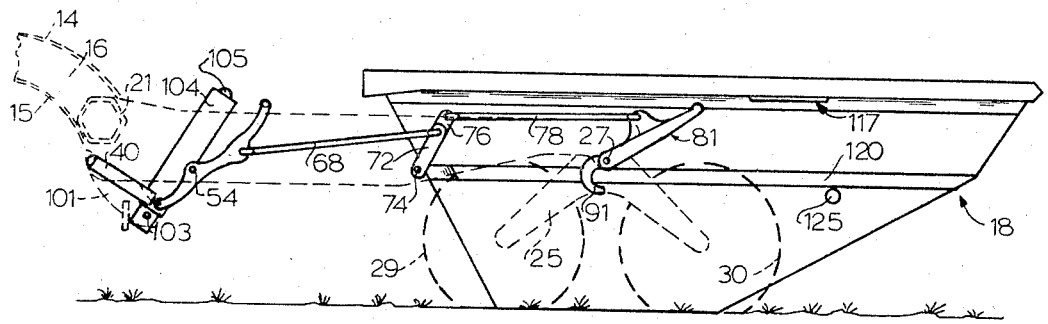
FIGURE 12 is a partial skeleton, elevation view of the trailer and slag receptacle showing the receptacle resting on the ground away from the lifting elements of the trailer.

The ends of piston arms 44 and 45 are pivotally connected to forward lift arms 51 and 52, respectively, and forward lift arms 51 and 52 are respectively and pivotally mounted on shifts 54, 55 and extend upwardly through respective slots 57, 58 located in draft arms 23 and 24. Forward lift arms 51 and 52 which are identical in structure are comprised of legs 60 and 61 which extend downwardly from the pivoting points and pivotally connect with piston arms 44 and 45, respectively. The upwardly extending portions of forward lift arms 51 and 52 are pivotally joined to connecting rods 68 and 69, respectively, and form lifting knobs 63 and 64 which are adapted to be received by and to support a portion of receptacle 18 and, alternatively as later explained in connection with the second embodiment, a removable frame 17 which carries slag pot 19. Connecting rods 68 and 69 are pivotally joined to internally mounted rocker arms 72 and 73 which are rigidly connected to shafts 74 and 75, respectively. Shafts 74 and 75 are transversely and rotatably mounted in draft arms 23 and 24, respectively, at approximately midway their lateral lengths and extend through the inwardly facing walls thereof. Shafts 74 and 75 also have rigidly mounted on their inwardly extending ends rocker arms 76 and 77 which mount between and externally of arms 23, 24 as best seen in FIGURE 1. Rocker arms 76 and 77 are longer than rocker arms 72 and 73 and although they are to be pivoted through the same arc, the ends of rocker arms 76 and 77 travel a greater peripheral distance than do the ends of rocker arms 72, 73. The upwardly extending ends of rocker arms 76 and 77 are furthermore pivotally connected to laterally extending connecting bars 78 and 79 which are pivotally connected to rear lift arms 81 and 82, respectively, thereby completing linkages 35 and 36.

Rear lift arms 81 and 82 are wishbone shaped and are pivotally mounted on axles 27 and 28. Rear lift arm 81 straddles draft arm 23 by means of extensions 84 and 85 and rear lift arm 82 straddles draft arm 24 by means of extensions 86 and 87. Extensions 84 and 85 of draft arm 81 and extensions 86 and 87 of draft arm 82 are respectively joined to form receptacle lifting knobs 88 and 89 which are adapted to slidably engage lift and support a portion of receptacle 18 and, alternatively, as later explained in connection with the second embodiment, removable frame 17. Extensions 85 and 86 of rear lift arms 81 and 82 are provided with downwardly extending and rearwardly facing hooks 91 and 92, respectively, which serve to support receptacle 18 during tilting and whose purpose is later explained in more detail.

Torque tube 20 is provided with a pair of downwardly extending parallel plates 101 and 102 which are rigidly mounted thereon and which, in effect, form a bracket which rotatably receives a laterally extending shaft 103 which in turn pivotally receives an upwardly positioned hydraulic cylinder 104. Hydraulic cylinder 104 pivots by means of shaft 103 and cylinder 104 is provided with a telescoping piston shaft 105 which is adapted to tilt and lift slag receptacle 18 and, in the second embodiment, to aid in lifting removable frame 17. By supplying hydraulic pressurized fluid to hydraulic cylinder 104 through hydraulic line 106, piston shaft 105 is extended upwardly. Piston shaft 105 is withdrawn by stopping the flow of pressurized fluid entering hydraulic cylinder 104 through line 106 and by allowing the fluid to exit from hydraulic cylinder 104 through return line 107. Fluid lines 106 and 107 are connected to a source and sump (not shown), respectively. A plate 100 is rigidly mounted between parallel plates 101 and 102 to limit the rearward pivoting movement of cylinder 104. The lower portions of hydraulic cylinder 104 only engage plate 100 when cylinder 104 is not engaging receptacle 18 or removable frame 17.

Receptacle 18 is comprised of a well portion 110 and a rim portion 111 which integrally extends outwardly and horizontally from the upper exposed edges of well portion 110. Rim portion 111 is provided with a pair of front grooves 112 and 113 which are oppositely located at its forward end and on its downwardly facing surface. Grooves 112 and 113 receive lifting knobs 63 and 64, respectively, of forward lift arms 51 and 52. Substantially equidistant between grooves 112 and 113, rim portion 111 is provided with a groove 115 which extends inwardly from its downwardly facing surface and which is adapted to receive the end of telescoping piston shaft 105. Rim portion 111 is also provided with a pair of rear grooves 117 and 118 which are oppositely mounted on its downwardly facing surface and which slidably receive lifting knobs 88 and 89 of rear lift arms 81 and 82. Parallel sides 122 and 123 of receptacle 18 are provided respectively with a pair of opposed and externally positioned aligning bars 120 and 121 which are spaced from ground engaging surface 124 a distance which is substantially equal to the elevation of hooks 91 and 92 from the ground. Thus, when trailer 10 is being backed into a position for receiving receptacle 18, hooks 91 and 92 strike aligning bars 120 and 121 and align receptacle 18 equidistant between draft arms 23 and 24. Receptacle 18 is further provided with a pair of axially aligned pins 125 and 126 which rigidly protrude outwardly from parallel sides 122 and 123, respectively, and which are adapted to be received by and to rotate in hooks 91 and 92, respectively. Since knobs 88 and 89 of rear lift arms 81 and 82 travel through a greater peripheral arc than do knobs 63 and 64 of forward lift arms 51 and 52, knobs 88 and 89 slide in respective grooves 117 and 118 and cause pins 125 and 126 to trace a hyperbolic arc rather than a circular arc thus aiding in the placement of pins 125 and 126 in hooks 91 and 92. Sides 122 and 123 may be tapered outwardly along their upper extremities to adapt receptacle 18 to be more easily loaded from either side.

Figure 13:
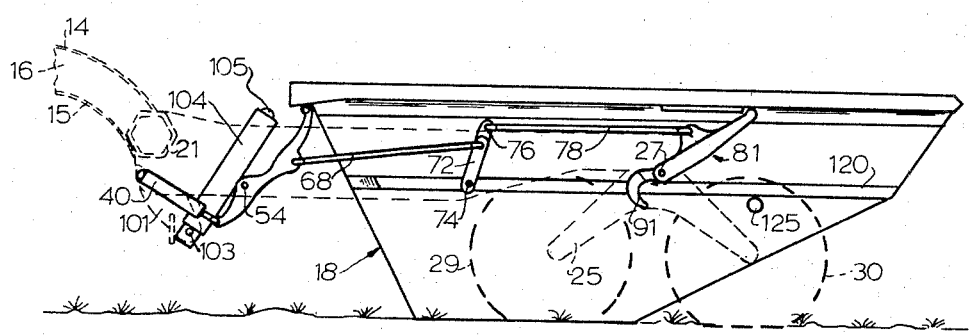
FIGURE 13 is a partial skeleton, elevation view of the trailer and slag receptacle showing the lift arms of the trailer slightly raised and positioned to engage the slag receptacle.
Figure 14:
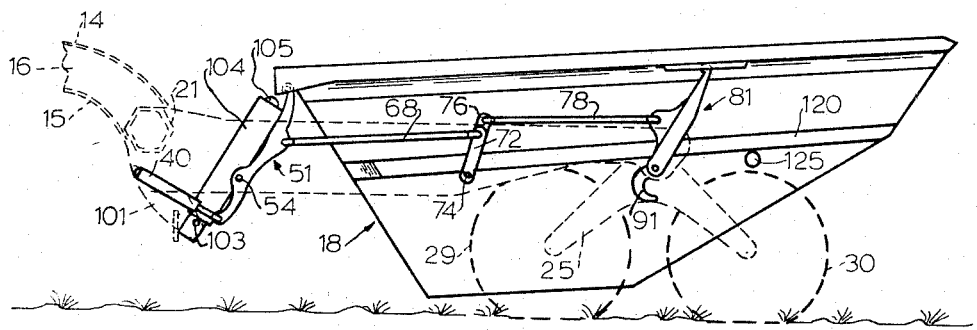
FIGURE 14 is a partial skeleton, elevation view of the trailer and slag receptacle showing the lift arms of the trailer having pivoted through an arc and thereby raising the receptacle from the ground.
Figure 15:
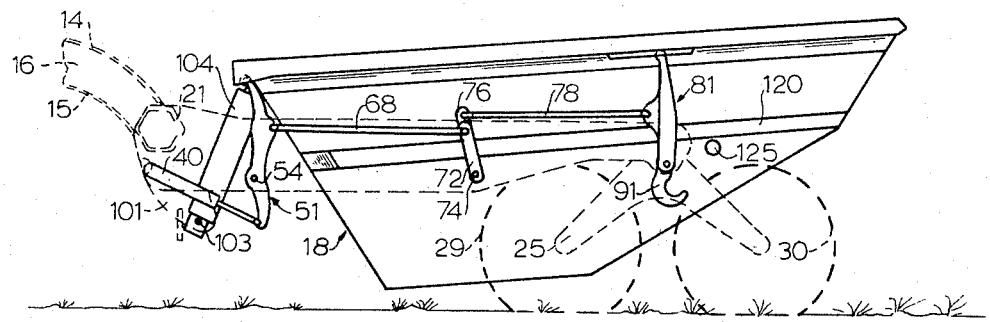
FIGURE 15 is a partial skeleton, elevation view of the trailer and slag receptacle showing the lift arms having been pivoted into a vertical position and the tilting cylinder about to engage the receptacle.

In receiving and raising receptacle 18 onto trailer 10, draft arms 23 and 24 are guided by prime mover 11 into a position of straddling receptacle 18. Receptacle 18 is properly aligned between draft arms 23 and 24 by hooks 91 and 92 sliding against aligning bars 120 and 121. The forward ends of aligning bars 120 and 121 are tapered so as to aid in this alignment. Receptacle 18 is prepared for lifting when forward lift arms 51 and 52 are received by groovers 112 and 113 and when rear lift arms 81 and 82 are slidably received by grooves 117 and 118, respectively, as shown in FIGURE 13. Hydraulically operated linkages 35 and 36 are energized and receptacle 18 is lifted from a ground engaging position as shown in FIGURE 3 to a transporting position as shown in FIGURES 4 and 16 by the forward pivoting movement of forward lift arms 51 and 52 and rear lift arms 81 and 82 as shown in FIGURES 14 and 15. Piston 105 is positioned so that the end thereof will hit and slide upwardly along wall 114 of receptacle 18 and will seat in groove 115 of rim portion 111 after receptacle 18 has passed through the zenith of its lifting arc and begins its downward movement toward the forward portions of trailer 10. Also, upon the downward movement of receptacle 18, pins 125 and 126 are received by hooks 91 and 92. To aid in the placement of pins 125 and 126 in hooks 91 and 92, linkages 35 and 36 act as a multiplier in that rocker arms 76 and 77 are longer than rocker arms 72 and 73 and thus travel through a greater circumferential arc. This greater arc causes the rear of receptacle 18 to be lifted higher than its front as shown in FIGURES 14 and 15 and fall more rapidly since lifting knobs 88 and 89 slide in grooves 117 and 118 after the lift arms have passed dead center (the position as shown in FIGURE 15). The downward arc traced by pins 125 and 126 is substantially elliptical or hyperbolic thus allowing pins 125 and 126 to travel downwardly in a more direct line into hooks 91 and 92. In transit, the hooks 91, 92 because of their smaller moment arm, being about one tenth of the moment arm of rear lift arms in one embodiment, carry a greater amount of the load placed on the rear of the trailer than do the rear lift arms 81, 82 which arrangement allows use of relative light structural members for the linkages 35, 36.

Receptacle 18 is pivoted into a dumping position by energizing hydraulic cylinder 104 which forces piston 105 outwardly and which, in turn, lifts receptacle 18 off forward and rear lift arms 51, 52, 81 and 82 and pivots receptacle 18 about an axis which extends through pins 125 and 126 into the position as shown in FIGURE 5. Receptacle 18 is then pivoted back into a transporting position by withdrawing piston 105 into hydraulic cylinder 104. Receptacle 18 is transferred from a transporting position to a ground engaging position by energizing linkages 35 and 36 in the reverse direction of that previously discussed; also, piston 105 of hydraulic cylinder 104 may aid in this movement by pushing receptacle 18 upwardly and rearwardly.

In the second embodiment of the invention, trailer 10 is adapted to lift slag pot 19 and for this purpose there is utilized a removable frame 17 which is provided with hollow parallel legs 131 and 132 which are adapted to rest on and be lifted from draft arms 23 and 24. Legs 131 and 132 are integrally connected at their forward ends by a laterally extending hollow connecting bar 133 and at their rear ends by an inverted U-shaped hollow connecting bar 134. High strength welded steel plate construction may be employed for the legs 131, 132, bar 133 and connection 134. Parallel legs 131 and 132 have integrally mounted on the inwardly facing portions thereof oppositely positioned and aligned upwardly facing horseshoe supports 135 and 136 which are adapted to receive and lift slag pot 19 by means of pins 137 and 138 which are in axial alignment and which extend outwardly from slag pot 19. The forward ends of legs 131 and 132 are provided with grooves 139 and 140 on their downwardly facing surface which respectively receive front lifting knobs 63 and 64 of forward lift arms 51 and 52. Since the hooks 91, 92 are not used with the slag pot, knobs 63, 64 are preferably secured by removable pins 150 mounted in legs 131, 132. Substantially equidistant between grooves 139 and 140, connecting bar 133 is provided with a groove 141 which extends inwardly from its downwardly facing surface and which is adapted to receive the end of telescoping piston shaft 105. Parallel legs 131 and 132 are also provided with a pair of longitudinally extending and parallel slots which are mounted on their downwardly facing surfaces and which slidably reecive the rear lifting knobs 88 and 89 of rear lift arms 81 and 82. The lifting of removable frame 17 and slag pot 19 is best shown in FIGURES 8 and 9.

In summary, the invention provides a receptacle and slag pot hauling structure which operates efficiently with the heavy tonnage loads encountered in steel making, slag processing and the like. The linkage and frame structure described are unique in adapting to both receptacle and slag pot hauling and to extremely heavy tonnages. Many different embodiments of this invention may be made without departing from the scope and spirit thereof. Therefore, it is to be understood that this invention is not to be limited except as defined in the appended claims.

Having described the invention, what I claim is:

1. In combination with a prime mover, a heavy duty vehicle adapted for lifting and transporting a slag receptacle, slag receptacle support frame, or the like, comprising:
  (a) a horizontally disposed U-shaped trailer having open and closed ends and comprising a pair of substantially parallel draft arm members and an end member integrally joining said draft arm members, said trailer end member being pivotally joined to said prime mover, and transversely spaced apart wheels mounted on said draft arms for supporting said open end;
  (b) a linkage provided for and mounted on each of said draft arm members, each linkage comprising a forward and a rear lift arm having respective forward and rear pivotal connections to said draft arm members, the ends of each said lift arm being movable between a lowered common horizontal planar position for directly engaging said receptacle, frame or the like through an arc which extends above and from a point behind the respective said pivotal connection to a point in front of the said respective pivotal connection at a raised carrying position, connecting means extending between and pivotally attached to said forward and rear lift arms whereby upon the impartation of motion to said linkage, the ends of said forward and rear lift arms move in unison between said lowered and raised positions and a pair of spaced apart, upwardly and rearwardly facing hooks mounted on said draft arms adjacent said open end;
  (c) a receptacle having a pair of laterally extending pins, said hooks being adapted to receive said pins when said receptacle is moved by said lift arms to said raised carrying position;
  (d) means mounted on said trailer adjacent said closed end for engaging and tilting said receptacle when in said raised carrying position whereby said receptacle is lifted from said forward and rear lift arms and is pivoted about said pins residing in said hooks; and
  (e) means mounted on said trailer and connected to said linkages for moving said forward and rear lift arms between said lowered and raised positions whereby said receptacle, frame or the like may be raised from the ground by direct and substantially simultaneous engagement with the ends of all of said lift arms, moved forwardly and upwardly on said lift arms and between said draft arms until the ends of said lift arms have moved through their respective arcs to said raised carrying position, supported directly on said lift arms for transportation in such carrying position and lowered directly, rearwardly and upwardly by said lift arms to the ground.

2. The combination of claim 1 wherein said hooks are integrally connected to and extend downwardly from said rear lift arms.

3. The combination of claim 2 wherein said tilting means comprises a hydraulic piston and cylinder arrangement pivotally mounted on said end member and including a telescoping member arranged to engage and tilt said receptacle.

4. The combination of claim 3 wherein said means for moving said forward and rear lift arms between said lowered and raised positions comprises a pair of spaced apart hydraulic cylinder means mounted on said closed end of said trailer and operatively connected to said forward lift arms whereby upon the energization of said hydraulic cylinder means, said forward and rear lift arms engage and raise said receptacle into said carrying position.

5. The combination of claim 4 wherein each said connecting means extending between said forward and rear lift arms includes a U-shaped multiplier rocker member having a short and a long arm and pivotally mounted in said draft arm member, a first rigid connecting rod extending between and having ends pivotally connected to said forward lift arm and said short rocker arm and a second rigid connecting rod extending between and having ends pivotally connected to said long rocker arm and said rear lift arm whereby the end of said rear lift arm is adapted to swing through the greater peripheral arc upon the movement of said forward lift arm by said hydraulic cylinder means.

6. The combination of claim 5 wherein said draft arm members are inverted U-shaped in cross-section, said rear lift arms each being wishbone shaped and having an upper lift leg and lower legs externally straddling said U-shaped draft arm members, said legs being mounted to pivot on an axis located transverse to said draft arm members, said upper leg being centered directly above said draft arm, and wherein said forward lift arms are pivotally mounted within and extend upwardly through said inverted U-shaped draft arms.

7. The combination of claim 6 wherein said spaced apart wheels for supporting the open end of said trailer include a forward and a rear wheel for each draft arm and an inverted V-shaped wheel support having two legs joined at a vertex portion with each of said legs rotatably receiving a selected wheel, said vertex portion of said V-shaped wheel support being inserted in said inverted U-shaped draft arm and being mounted to pivot around the same said transverse axis as said rear lift arm whereby said upper leg is centered above said wheels.

8. In combination with a prime mover, a heavy duty vehicle adapted for carrying and dumping slag material and the like, comprising.
  (a) an open top receptacle having a bottom, end and opposed side walls, a pair of oppositely disposed, axially aligned pins externally mounted on and extending horizontally outwardly from said sides and an outwardly extending, horizontally disposed rim portion substantially circumscribing said open top, said rim portion having on its downwardly facing surface a plurality of shaped indentations;
  (b) a horizontally disposed U-shaped trailer having open and closed ends and comprising a pair of substantially parallel, downwardly facing hollow U-shaped draft arms, an end member integrally joining said draft arms, said trailer end member being pivotally joined to said prime mover, said draft arms and said end member forming a compartment for receiving said receptacle with said rim portion overlying portions of said draft arms, a pair of axially aligned shafts transversely located in the rearward portions of respective draft arms, an inverted V-shaped wheel support for each respective draft arm having its legs joined at a vertex portion, said vertex portion being pivotally mounted on the respective said transverse shaft and positioned in said U-shaped draft arm to align said legs of said wheel support in a forwardly and rearwardly position in the vertical plane of said draft arm, and a forward and rear wheel rollably mounted respectively on said forwardly and rearwardly positioned legs of each of said wheel supports and positioned in the vertical plane beneath said draft arm;
  (c) a forward lift arm pivotally mounted in and extending upwardly through each of said draft arms and positioned substantially adjacent said end member of said trailer, each said forward lift arm having a receptacle engaging knob at its upper end which is received by and is pivoted in a forwardly positioned selected indention of said receptacle rim portion and each said forward lift arm being pivotal in a vertical plane which is in parallel with the central vertical plane of said draft arm;
  (d) an integral inverted wishbone shaped rear lift arm for each said draft arm having on an upwardly extending leg a receptacle engaging knob in horizontal alignment with said knob of said forward lift arm and being slidably received by a rearwardly positioned selected indention in said receptacle rim portion, a pair of downwardly extending lower legs joined by the said upwardly extending leg and externally straddling said U-shaped draft arm member, each said rear lift arm being arranged to pivot on said transverse shaft at the juncture between said legs, and an upwardly and rearwardly facing hook extending downwardly from and integrally connected to the respective said lower leg of each respective rear lift arm positioned on the inside of said compartment, said hooks adapted to receive and pivotally mount said pins of said receptacle;

(e) a linkage for each draft arm and connecting said forward lift arm with said rear lift arm, each said linkage comprising a U-shaped multiplier bracket pivotally mounted in said draft arm between said forward and rear lift arms, said multiplier having a short rocker arm mounted internally in said draft arm and a long rocker arm mounted externally of said draft arm and in said compartment, a first connecting bar pivotally joined to and extending between said forward lift arm and said short rocker arm and a second connecting bar joined to and extending between said long rocker arm and said rear lift arm whereby upon the movement of said lift arms, said receptacle supporting knobs of said rear lift arms travel through longer arcs than do those knobs of said forward lift arms;

(f) means mounted on said trailer and operatively connected to said forward lift arms for moving said forward and rear lift arms in unison between a lowered position for directly engaging said receptacle through arcs being above said points of pivotal connection to a raised carrying position whereby said pins of said receptacle are pivotally positioned in said hooks; and (g) hydraulic cylinder means mounted on said end member of said trailer and operatively engaging the front of said receptacle rim portion for tilting said receptacle about said pins whereby said container is dumped.

9. A receptacle for use with a heavy duty ground traversing U-shaped vehicle trailer of the type having horizontally extending parallel draft arms supported by wheels, a rigid member connecting the forward ends of said draft arms and supported by a prime mover, and having forward and rear lift arms mounted on each of said draft arms and movable between a lowered substantially horizontal position and a raised substantially vertical position with each said rear lift arm having a rearwardly facing hook extension positioned between said draft arms a distance above said ground, said receptacle being adapted to be lifted and moved by said trailer comprising: a substantially rectangular horizontal bottom wall defined by parallel and perpendicular side, forward and rear edges; a pair of opposed side walls connected to and extending vertically upwardly from the edges of said bottom wall; a front wall integrally connecting said side walls and extending upwardly from the forward edge of said bottom wall; a rear wall integrally connecting said side walls and sloping upwardly and outwardly from the rear edge of said bottom wall; a horizontally disposed flat rim portion integrally connected to, extending outwardly from and circumscribing the upper edges of said side and front walls, said rim portion having on its downwardly facing surface adjacent and parallel to each respective side wall near said rear wall an elongated groove adapted to slidably receive the end of a respective one of said rear lift arms and spaced forwardly of said groove and located on said surface adjacent each said side wall and near said front wall, a slot adapted to engage the end of a respective one of said forward lift arms, said receptacle grooves and slots being arranged such that when said forward and rear lift arm move from said horizontal position to said vertical position, said forward and rear lift arms engage said respective slots and grooves and raise said receptacle to a carrying position; a pair of oppositely disposed, axially aligned pins externally mounted on and extending outwardly from said pair of parallel side walls, said pins being adapted to be received by and rotate in said rear lift arm hooks and to serve as an axis about which said receptacle may be pivoted when said receptacle has been raised into a carrying position; and a pair of oppositely disposed, parallel and horizontally arranged aligning bars externally mounted on said side walls a distance upwardly from said bottom wall being substantially equal to the elevation of said hooks from said ground whereby said aligning bars are adapted to impinge against said hooks and position said receptacle between said draft arms of said trailer while said trailer is being moved into a position for engaging and lifting said receptacle.

References Cited

UNITED STATES PATENTS

| | | | |
|---|---|---|---|
| 1,728,519 | 9/1929 | Tuerck | 214—390 |
| 2,934,228 | 4/1960 | Hillberg | 214—390 |
| 3,024,931 | 3/1962 | Grover et al. | |
| 3,300,071 | 1/1967 | Isaacs | 214—390 |
| 3,083,850 | 4/1963 | Owen | 214—390 |

GERALD M. FORLENZA, *Primary Examiner.*

ALBERT J. MAKAY, *Examiner.*